March 29, 1955   A. H. WILKINSON   2,705,059
EXTERNAL BRAKE
Filed Aug. 27, 1949   2 Sheets-Sheet 1
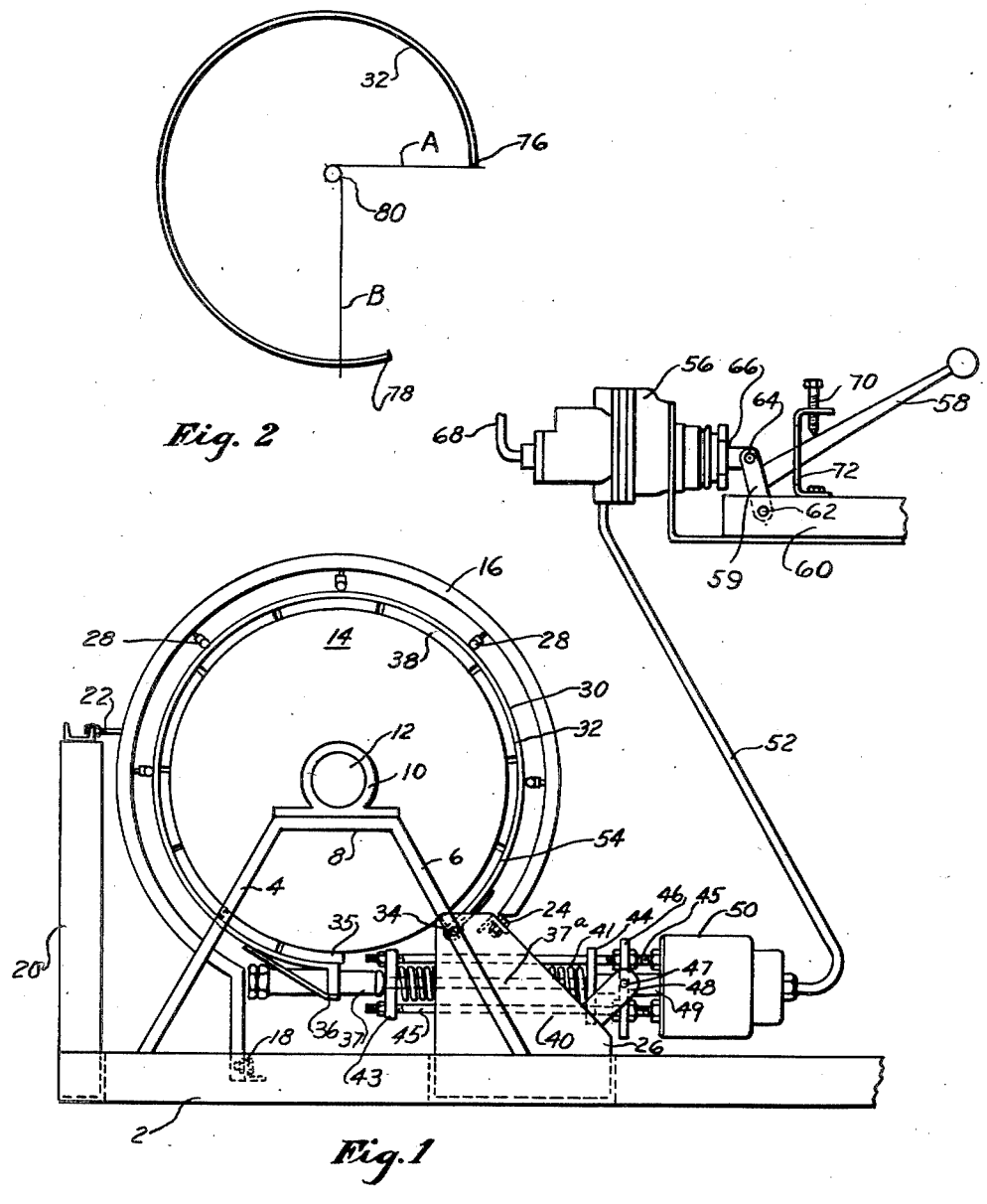
INVENTOR.
Alvin H. Wilkinson
BY
C. M. McKnight INVENTOR.
Alvin H. Wilkinson
BY

United States Patent Office 2,705,059
Patented Mar. 29, 1955

2,705,059

EXTERNAL BRAKE

Alvin H. Wilkinson, Tulsa, Okla., assignor to Franks Mfg. Corporation, Tulsa, Okla., a corporation of Oklahoma Application August 27, 1949, Serial No. 112,680

2 Claims. (Cl. 188—170)

This invention relates to improvements in brakes and the associated control mechanisms and more particularly, but not by way of limitation, to a more easily controllable brake and control mechanism wherein the brake is spring-held and pneumatically released.

In many applications of braking mechanisms it is desirable to exercise close control of the braking operation and to permit a certain degree of slippage. Further, in order that the brake control operator may exercise the desired control, it is important for him to be able to sense the "feel" of the braking action force which is being exerted. Examples of such applications are, well drilling, excavating, dredging, and digging operations. In these applications of brake mechanisms it is necessary that the desired "feel" of the brake be imparted to the operator through the control device, since the operator is not a part of the load being braked and cannot sense the inertia changes of the braked load.

Also, it is often desirable to exercise close braking control over a wide range of loads. For example, while drilling a well at a shallow depth a very light load is held and gradually payed out; whereas at greater depths much heavier loads must be controlled, so as to prevent an undue load on the drilling bit and an undesired deflection of the hole. Spring-loaded pneumatically released brakes are commonly used. Also it is common practice to employ the self-actuating braking force which results from applying tension around an external brake band in the same direction the brake drum is rotated. In the usual application of the self-actuating principle, however, the entire brake shoe area is engaged at once and the braking action is jerky and not easily controlled. In accordance with my invention the brake band is of such design and is arranged so that the brake shoe area engages the drum progressively and the self-actuating braking force can be applied smoothly and efficiently.

Some types of brake control mechanisms are such that the operator may feel or sense the position of the controlling device. An example of such a mechanism is illustrated in the patent to Page, No. 2,308,299, issued January 12, 1943. However, in pneumatically released brakes the position of the control device is not instantaneously indicative of the braking force, because of the time-lag in admitting and discharging compressed air to and from the actuating cylinder. By means of my invention the operator may sense the braking force by the force he must exert on the brake control device.

An important object of this invention is to provide a brake and control mechanism whereby a wide range of loads may be closely controlled and braked by the operator.

Another object of this invention is to provide a brake band of such design that the self-actuating force may be utilized and applied smoothly and gradually.

And still another object of this invention is to provide a brake drum and brake band arranged so that as the brake is applied the proportion of the total brake shoe area coming into engagement with the brake drum is gradually increased until the total area is engaged.

And still another object of this invention is to provide a brake control mechanism whereby the brake operator may sense the degree of braking action applied at any moment.

And still another object of this invention is to provide in combination a novel brake design and brake control mechanism whereby a close control of the braking action is easily obtained.

Other objects and advantages of the invention will be evident from the following detailed description, read in conjunction with the accompanying drawings, which illustrate my invention.

In the drawings:

Fig. 1 is a side elevational view of a brake together with the actuating mechanism and the control device.

Fig. 2 is a side elevational view of the new spiral shaped brake band.

Figure 3:
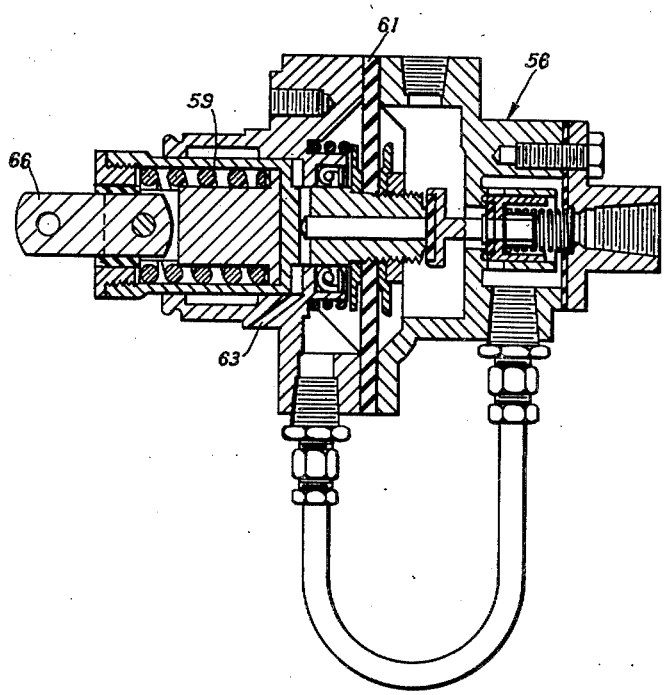
Fig. 3 depicts the internal structure of the pressure-regulating valve.

Referring to Fig. 1, the brake structure comprises a base on skid member 2 having angularly disposed channel members 4 and 6 extending upwardly and connected by a cross bar 8 normally supporting a bearing 10 and a shaft 12 about which revolves the rotating drum 14.

A substantially circular outside ring member 16 is anchored at 18 to the base 2, and to a vertical bracket 20 at 22. The opposite end of the ring 16 is anchored at 24 to an upstanding bracket 26 provided on the skid 2. The ring 16 is preferably a channel member, and merely acts as a limiting element or means to preclude unusual or abnormal expansion of the brake member. The inner periphery of the channel 16 is provided with a plurality of circumferentially spaced rollers 28 adapted to engage the outer face 30 of the brake band 32. The brake band 32 comprises a substantially circular rim member anchored at 34 to the top portion of the bracket 26, and extending around the drum 14. The opposite end 35 of the band 32 is provided with a free movable joint 36 adapted to be secured to a plunger member 37. The brake rim 32 is provided with a plurality of circumferentially spaced brake shoes 38 extending completely around the inner periphery of the band 32.

One of the essential features of the present invention is the spirally wound brake band 32, as illustrated in Fig. 2, as well as the novel brake control mechanism whereby the degree of the braking force can be "sensed" by the operator. It will be apparent from the preformed spiral shape of brake band 32 and from the fixed point of anchoring 34 that, in the released position, the band 32 and its complementary brake shoes 38 assume a spiral disposition around the drum 14 with the anchor point 34 being the point on the band 32 located closest to the drum 14. The purpose of this arrangement is to provide for a progressive engagement of the brake shoes 38 with the drum 14 as the brake is applied. The counter-clockwise rotation of the drum 14 provides a self-energizing apparatus, and the progressive engagement of the brake shoes permits close control over the self-energization.

The skid actuator member (preferably pneumatic) comprises the plunger 37 and spring cage 40 in which is disposed a helical spring 41 anchored at opposite ends between two plates 43 and 44, with plate 43 being secured to the plurality of (preferably four) rods 45, and plate 44 being secured to plunger shaft 37a and slidable longitudinally along the rods 45. Toggle plate 46 is disposed in longitudinally spaced relation to plate 43 and the pneumatic actuator mechanism 50 by rods 45 and is provided on opposite sides with male lugs 47, which are adapted to mate with support brackets 48 provided on main bracket 26 for holding the assembly in place to actuate the brake. The main plunger shaft 37a extends through the spring 41 and to the plate 44. A suitable fluid actuated piston 49 disposed in the cylindrical housing 50 is not shown in detail. Air pressure admitted from a suitable source (not shown) through line 52 exerts a force on the piston 49 urging the shaft 37a, plate 44 and movable joint 36 to the left (according to Fig. 1) to release the brake. The forces exerted by the spring 41, and that of the air pressure are opposed, so that the brake apparatus is spring actuated, and pneumatically released.

It will be noted that the stationary anchor position 34 of the brake rim 32 is disposed vertically above the floating anchoring position afforded by the movable joint 36. In the actuation of the brake rim 32 by the pneumatic release of the spring 41, the stationary anchor of the brake at the fulcrum point 34 is disposed above the floating point 36, providing for an immediate engagement of the brake rim 32 at a point in proximity of the fulcrum point 34, as shown at 54. In conjunction with the spiral disposition of the brake rim 32, a continued application of spring pressure will cause a progressive contact or engagement of the shoes 38, with the drum 14 substantially around the circumference of the drum.

As a necessary, or auxiliary adjunct to the external air brake apparatus, there is provided a control device cooperating with the air actuator mechanism 50, and communicating therewith through conduit 52. This control mechanism comprises a pressure-regulating valve 56 and actuating control lever 58. The lower extremity of lever 58 is provided with an arm 59 secured at one end to base bracket 60 to hinge pin 62, and at the opposite end in spaced relation to hinge pin 64 for securing the lever 58 to plunger 66 of the valve 56. Air at substantially constant pressure from a suitable source (not shown) is supplied to valve 56 through conduit 68, and the regulated air pressure is is delivered by valve 56 in one position through conduit 52 in communication with the actuating unit 50. A stud shaft 70 is disposed through an upstanding bracket 72 secured to base 60, and is adapted for adjustment against upper face of lever 58 to limit the upward movement of the control lever as desired.

The valve unit indicated generally at 56 is preferably of the spring-diaphragm form or any suitable type, wherein there is a constant spring force on the piston 66 urging the lever in one direction. It will be apparent that the stud 70 (Fig. 1) may be adjusted on the bracket 72 to vary the stop position of the lever 58 in a counter-clockwise direction. As soon as the lever 58 is moved clockwise, there is a compression of the valve spring 59 (Fig. 3) in the pressure regulating valve 56 to provide a greater pressure against the diaphragm 61 than that of the air pressure from conduit 68, whereupon the pressure regulating valve is in open position as clearly shown in Fig. 3 to permit an exhaust of air or fluid from the actuating device 50 through conduit 52 and through exhaust ports 63 provided in the valve 56. It will thus be apparent that the pressure on the lever 58 exerted by the operator may become variable and introduce a "feel" relative to the lever 58 because, as the fluid pressure in actuator 50 is exhausted through conduit 52, there is an increase in the differential pressure in the regulator valve 56 between the supply pressure from conduit 68 on the one side of the diaphragm 61, and the exhaust ports 63 on the opposite side. Consequently, as the differential pressure of the regulating valve increases, the pressure required on the handle 58 increases. With the handle 58 moved in a clockwise direction and to a downward position, the fluid actuator 50 is substantially exhausted, thereby permitting spring 41 to move the brake rim 32 and the brake shoes 38 into contact with the drum 14. A release of the handle 58 for a counter-clockwise movement will place the regulating valve 56 in a position to direct supply fluid pressure from conduit 68 into conduit 52 for expansion of the pneumatic actuator 50 and piston 49 to cause a compression of the spring 41 and release of the brake rim 32 and their connected shoes from the rotating drum 14.

Alluding further to the spiral configuration of the brake rim 32, this rim is normally rolled of a spiral configuration in order to provide a variable increase in radius from one end to the opposite end. In Fig. 2, the radius of the rim 32 increases slightly from the end 76 to its opposite end 78, as will be apparent from the distance between the indicated spiral hub 80 for purposes of illustration, and the end 76, as noted by "A' as compared with the increased distance as designated "B."

From the above it will be apparent that release of the coil spring 41 will progressively move the spiral band or rim 32 and its connecting shoes 38 into contact with the rotating drum 14, until the spiral band assumes the substantially circular configuration of the drum 14. However, upon compression of the spring 41 to release the brake rim 32, the spiral configuration will cause the rim and shoes to move away from the drum throughout its entire circular periphery. The rollers 28 on the outside rim 16 have a tendency to limit the expansion of the rim, or its movement away from the drum 14 in released position.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a brake mechanism comprising a support, a rotating brake dum mounted on the support, a brake band of substantially spiral configuration encircling the drum and secured at one end to the support, a helical spring cooperating with the opposite end of the spiral band, a pneumatic piston controlling the spring for alternately causing engagement and release of the spiral band relative to the drum, said spiral configuration of the brake band providing a progressive areal engagement of the band from the anchor point around the drum as tension of the spring increases.

2. In a brake mechanism comprising a support, a rotating brake drum mounted on the support, a brake band of substantially spiral configuration encircling the drum and secured at one end to the support, a helical spring cooperating with the opposite end of the spiral band, a pneumatic piston controlling the spring for alternately causing engagement and release of the spiral band relative to the drum, said spiral configuration of the brake band providing a progressive areal engagement of the band from the anchor point around the drum as tension of the spring increases, a source of supply fluid pressure for the pneumatic piston, a regulating valve for controlling the fluid pressure, and actuating means for the valve responsive to pressure from the valve to increase the resistance against movement of the actuating means in one direction.

References Cited in the file of this patent

UNITED STATES PATENTS

| 862,403 | Lahue | Aug. 6, 1907 |
| 971,377 | Herr | Sept. 27, 1910 |
| 1,401,597 | Frey | Dec. 27, 1921 |
| 1,567,982 | Pfeiffer | Dec. 29, 1925 |
| 1,594,942 | Guernsey | Aug. 3, 1926 |
| 1,652,074 | Watson | Dec. 6, 1927 |
| 1,997,727 | Greve | Apr. 16, 1935 |
| 2,016,875 | Sneed | Oct. 8, 1935 |
| 2,237,095 | Casner | Apr. 1, 1941 |
| 2,270,431 | Freeman | Jan. 20, 1942 |
| 2,308,299 | Page | Jan. 12, 1943 |